(12) United States Patent
Lyda

(10) Patent No.: US 7,730,506 B1
(45) Date of Patent: *Jun. 1, 2010

(54) METHOD AND APPARATUS FOR RESPONSE SYSTEM

(76) Inventor: Edwin Lyda, P.O. Box 8488, The Woodlands, TX (US) 77387

(*) Notice: Subject to any disclaimer, the term of this patent is extended or adjusted under 35 U.S.C. 154(b) by 0 days.

This patent is subject to a terminal disclaimer.

(21) Appl. No.: 12/231,467

(22) Filed: Sep. 3, 2008

Related U.S. Application Data

(63) Continuation-in-part of application No. 09/920,961, filed on Aug. 3, 2001, now Pat. No. 7,434,243.

(60) Provisional application No. 60/222,673, filed on Aug. 3, 2000.

(51) Int. Cl.
*H04H 60/33* (2008.01)
*H04N 7/173* (2006.01)

(52) U.S. Cl. .............................. 725/13; 725/9; 725/105

(58) Field of Classification Search .................... 725/9, 725/13, 105

See application file for complete search history.

(56) References Cited

U.S. PATENT DOCUMENTS

| 5,303,042 A | * | 4/1994 | Lewis et al. | 348/14.01 |
| 5,721,584 A | * | 2/1998 | Yoshinobu et al. | 725/114 |
| 6,005,490 A | * | 12/1999 | Higashihara | 340/825.72 |
| 6,467,089 B1 | * | 10/2002 | Aust et al. | 725/13 |

* cited by examiner

*Primary Examiner*—James Sheleheda
(74) *Attorney, Agent, or Firm*—Mary J. Gaskin

(57) ABSTRACT

A remote response system that utilizes portable response devices that require a user to input a program code and response data, which are transmitted over existing communication systems to a central location for processing. Certain response devices communicate over wireless systems, while other response devices communicate over plain old telephone systems by sending data bursts or by dialing different, pre-established telephone numbers. A user of the response device can communicate with a presenter of programming that is live or broadcast over audio/visual mediums in real time, without requiring the user to have a personal computer.

11 Claims, 4 Drawing Sheets

METHOD AND APPARATUS FOR RESPONSE SYSTEM

RELATED APPLICATIONS

This application is a continuation in part of patent application Ser. No. 09/920,961, which was filed on Aug. 3, 2001, and which is presently pending and will issue as U.S. Pat. No. 7,434,243, and which claimed priority from U.S. Provisional Patent Application Ser. No. 60/222,673, which was filed on Aug. 3, 2000.

FIELD OF THE INVENTION

The present invention generally relates to novel methods and systems for obtaining real time responses to remote programming.

BACKGROUND OF THE INVENTION

Remote learning and other remote response systems allow a broadcaster, such as a teacher or a game show host, to communicate with a large audience that is remote in time and/or distance from the broadcaster. Current remote response systems that allow a geographically diverse audience to communicate with a broadcaster are centered around computer systems that utilize the world wide web. Other remote response systems provide feedback communication from an audience that is sitting in the same room as the broadcaster utilizing infrared, hard-wired connections, or radio signals. Such systems operate using wireless and/or wired technology that send signals to a receiver within the room, which in turn displays the responses to the broadcaster.

Drawbacks to the existing technology for remote response systems include the required expense of a computer device, such as a personal computer, for each student at a remote location; or the limited range of the wireless/wired technology employed. Requiring a computer device for each student often requires a classroom equipped with computers, and a need for at least some students to assemble in such a classroom. The need for a building and personal computers increases the overall cost and expense of the remote response system. Remote response systems that operate within a small space, such as a broadcasting studio, are limited to use in situations where audience members can all gather in the small space.

Accordingly, there is a need for enabling real time responses from geographically remote locations to a broadcast, while the broadcast is being created. There is also a need to eliminate the necessity of a personal computer and an Internet connection for each person who wants to respond to the broadcast.

SUMMARY OF THE INVENTION

It is an object of the present invention to provide an apparatus and a method that allows persons viewing or listening to a broadcast to respond to the broadcast in real time without requiring a personal computer.

It is another object of the present invention to incorporate viewer and/or listener responses as part of the program while the broadcast is being created.

To accomplish the above and other objects, the present invention provides a response device for each person who is listening to/viewing a program. The response device contains an input mechanism so that a user may input data, and then transmit the data over a standard communication system. Because the response device does not receive the program data itself, it does not require extensive onboard memory. The communication system may consist of any wired or wireless system, such as POTS (plain old telephone system), cellular, wi-fi, 802.11g or similar network, paging, telenet, business data networks, 3G type systems, SMS, web, e-mail, and other networks capable of sending data over long distances.

The data is collected at a central location where a computer system processes the data according to which programming the data relates to. For example, when a user responds to a question on a program, the user inputs the user's response and a program code into the response device. When the user's response is received at a central location (for example, where the broadcast originates) via the communication system, a computer system processes the response data. For example, a program code included in the response data is used to route the response to the presenter of a particular program. Besides routing raw response data, the computer system at the central location may process the data further by collating data, summarizing data, analyzing, filtering, and performing other known data processing techniques.

Once the response data has been sent to the presenter of the program, the presenter of the program is able to view the responses on a display. This allows the program presenter to respond to audience members' questions and answers, and also allows the program presenter to modify the content of the program as needed to meet the needs of the audience.

DETAILED DESCRIPTION OF THE INVENTION

Figure 1:
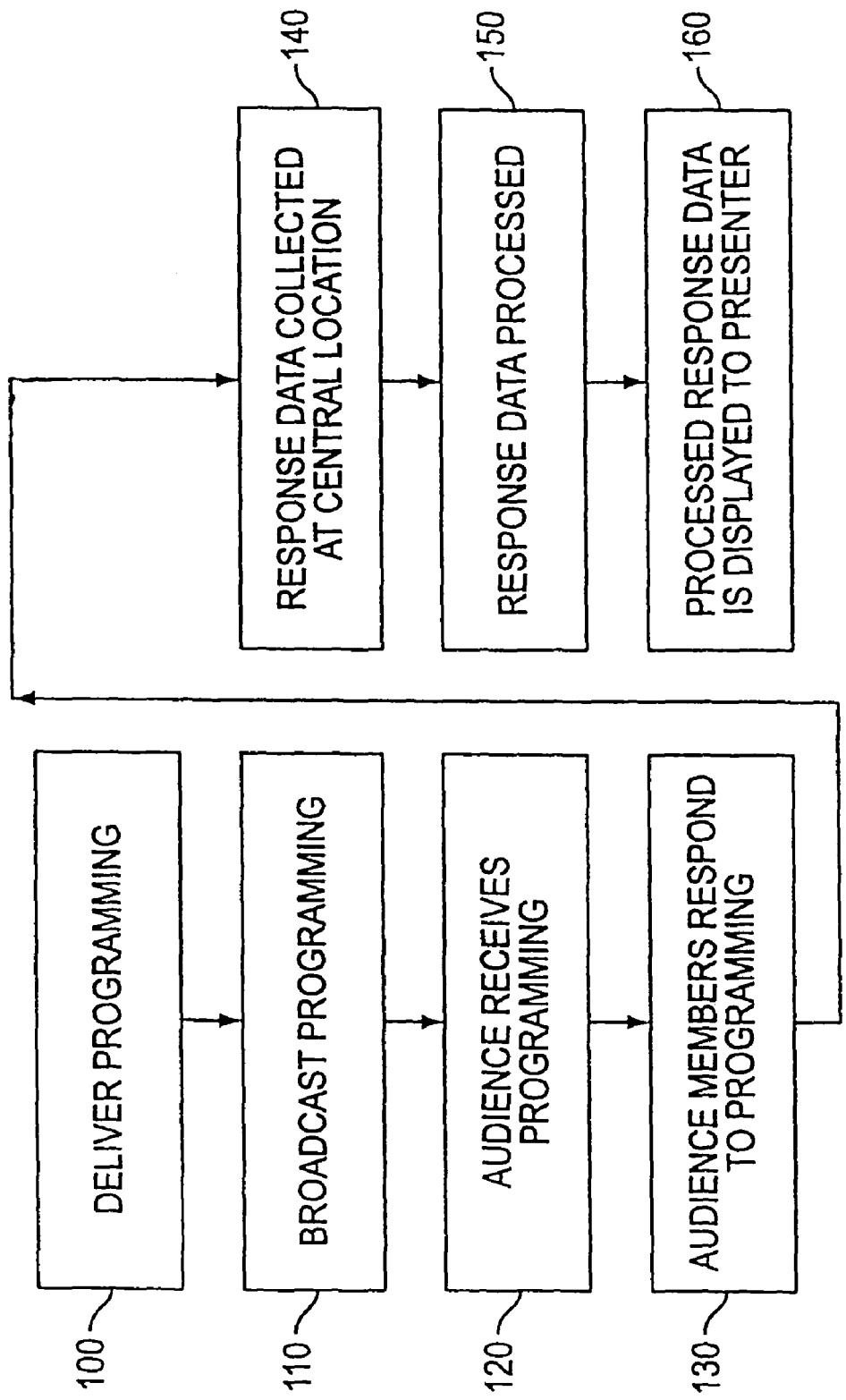
FIG. 1 depicts a processing flow for responding to a broadcast according to an embodiment of the present invention.
Figure 4:
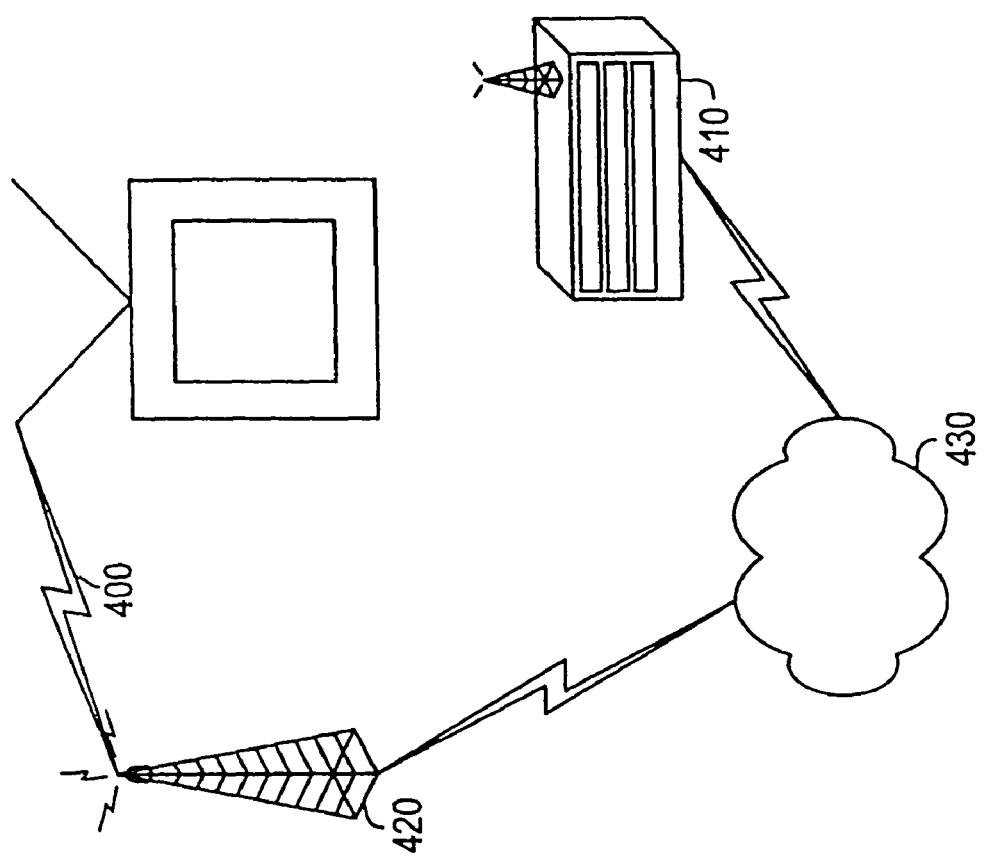
FIG. 4 depicts a schematic system according to an embodiment of the present invention.

Referring in FIGS. 1 and 4, the processing flow of an exemplary embodiment according to the present invention is discussed. At step 100 a presenter delivers programming content. For example, the presenter gives an educational lecture, directs a game show, gives instruction regarding how to make/prepare an item, or other content that audience members can receive via audio and/or visual communication systems and interact with. The present invention applies to situations when one presenter is delivering one program and to situations where many presenters are presenting many programs at the same time or at staggered times. As each presenter delivers programming, the programming is broadcast at step 110 utilizing well-known communication systems 400. For example, the programming is broadcast live over radio waves, television, the Internet, satellite communication, wi-fi, G3, and other well-known video/audio communication mediums 400. The programming may also be delayed, for example, on a previously recorded tape, CD or DVD, or printed medium before it is broadcast or distributed.

At step 120 audience members receive the programming. Because the programming is broadcast over conventional communication mediums 400, it is easy for audience members to have ready access to the programming. Utilizing conventional communication mediums 400 also allows audience members to be geographically diverse from one another without requiring each individual audience member to purchase expensive equipment, such as a personal computer, to receive the programming and to respond to the programming. Additionally, audience members do not need to gather together as required by existing systems and methods.

Because each individual audience member does not require a personal computer, there is no need to construct facilities and provide computer equipment in order for audience members to receive the programming and to respond to the programming. Eliminating the need to construct buildings and provide computer equipment for the audience reduces the overall cost of establishing and operating the system of the present invention.

During step 120, while the audience is receiving the programming, and as part of the programming, a presenter can solicit a response from each audience member, or, alternatively, an audience member may need clarification on something the presenter has delivered. At this point, each individual audience member can input his response or question into the response device 410. Inputting a response into the response device 410 is described in detail, infra.

In using the present invention, the audience member responds directly to the words or question of the presenter delivered over a standard communication medium, not to any information which is transmitted to the response device. While it is possible the response device used (as, for example, a standard two-way paging network or POTS, or another technology) may have the ability to receive information as part of the device, the present invention does not encompass audience response to information received by the response device. The audience responds to the information presented by the program's presenter.

When an audience member presses a send key on the response device, a transmission is made over a communication system 430, in certain embodiments a two-way paging network. Utilizing a paging network or other wireless data network has several advantages that provide low cost and flexibility of use for the present invention. Such advantages include use of existing technology, (paging systems have been constructed and are already in place in many locations throughout the world) paging systems are relatively inexpensive to use, and paging systems do not require audience members to be in one location in order to transmit responses back to a central location 420 where programming originates. One-way paging networks are used with other embodiments of the present invention. In addition to allowing an audience member to respond to programming, a two-way paging network permits a direct response to a particular audience member by the program presenter of by an assistant to the program presenter.

In other embodiments of the present invention, transmission of response data at step 130 is made over communication system 430, which comprises telephone lines and equipment. One type of response device 410 calls a specific telephone number that corresponds to a specific response for a specific program. For example, several toll free numbers are established for each response to each question for a program. A presenter asks the first question, for example a true/false question, to which audience members respond. When a response device has "true" selected, the response device calls a particular toll free number. When a response device has "false" selected, the response device calls a different, particular toll free number. In such a manner, each audience member's response, either true or false, is recorded for the first question. The presenter may then ask the second question, for example a multiple choice question. Each audience member responds by selecting a multiple choice answer. Each of the multiple choice answers calls a different toll free number, thus indicating the response for each audience member. Other arrangements of questions, answer choices, and telephone numbers are within the scope of the present invention as will be recognized by one of ordinary skill in the art.

For a response device that calls different telephone numbers, the user must first obtain the program code for the program that the user is listening to/watching. The user can log in to the central data location using a login key. For example, the user presses the login key (see FIGS. 2 and 3) to place a call to a central location. When the user's call is answered, data is sent over the telephone lines asking which program the user is receiving, e.g., the central location may ask the user to respond true/false (or yes/no) to a series of programs. When the user positively responds to a program, the program code and associated telephone numbers to call for each answer are downloaded into the response device 410. Answer choice telephone numbers may have a one-to-one correspondence, i.e., each answer choice for each question has a different telephone number. Answer choice telephone numbers may also be arranged by type, i.e., a telephone number for "true," a telephone number for "false," a telephone number for multiple choice answer "A," et cetera. For example, when answer choice telephone numbers are arranged by type, a timing system, such as a set time period for replying to a particular question, can be used to distinguish a response to one question indicating "true" from a response to another question indicating "true"; as will be recognized by one of ordinary skill in the art, many arrangements for associating telephone numbers with response choices are possible and within the scope of the present invention.

Once such a response device 410 calling different telephone numbers is logged-in to the system at the central location 420, a call from such a response device 410 does not actually have to be answered, but merely recorded that the call was placed. The fact that the call was placed indicates the user's response, and an automatic number identification system, or caller identification, where available, is used to indicate which audience member called in the response. Thus, a presenter who is giving a quiz, or test, for example, knows each individual audience member's answers and can accurately grade each audience member's score for the quiz/test.

Another response device 410 according to another embodiment of the present invention calls a telephone number at the central location 420 and sends a short data burst over telephone wires. Such a data burst sent over the telephone wires is similar in content to a data burst sent over a paging system.

The functionality of the response device of the present invention may be packaged as part of other technology, such as within a telephone, a cellular telephone, an Ipod, an MP3 player, a pager, a PDA, or similar device. If that is done, the response device will still perform the functions described for the present invention.

At step 140, response data from audience members is collected at a central location 420. When response data is collected from a paging network, or from a data burst sent over telephone lines, the program code included in the response data indicates which particular program each particular response is related to. When the response data is collected at the central location that originates from the specific response telephone numbers for each particular program, the response telephone number that was called is the indication used to associate the response with a particular program.

As described above, the data bursts contain at least an identifier. For an individual who owns and uses a single response device, the identifier of the response device (such as a serial number for example) is automatically included with the user's responses. Inclusion of the user's response device identifier serves to identify the user, so that the user's responses can be recorded and associated with the user. Since the device identifier serves to identify the user, the device identifier can also be associated with contact information (such as telephone number, or e-mail address, etc. established as part of a user's account at the central location when the user registers to use the remote response system). This contact information permits the presenter, or someone working with the presenter, to reply to the user's question on an individualized, personal basis.

When a response device that sends data bursts is used by several users, each user inputs a user identifier that identifies each particular user when responding to programming. Such user input identifiers provide the same functionality as described above, without requiring each user to own a response device. When a response device responds by calling different telephone numbers, instead of sending a data burst over telephone lines, a paging system, or other wireless network, the automatic number identification, or caller identification, serves to identify the response device, which in turn identifies the user.

The response data is then processed at step 150. For example, the response data is processed according to what particular program the response data is related to based upon a program code, or specific telephone number called by the response device, and the raw response data is then routed to the presenter of each program. Because the response data is collected in a computer system, processing of the response data can be much more complex. For example, the response data may be processed to categorize the responses, summarize the responses, prioritize the responses, associate like responses with one another, and etc., utilizing simple sort routines, artificial intelligence software, or other information processing techniques. The processed response data is then sent to each presenter of each program at step 160, where the presenter of each program is able to view the response data. If the programming is being presented live as the responses are sent in, the program presenter can incorporate the responses into the programming and modify the programming to meet the audience's needs.

Response Device Input Capabilities

Figure 2:
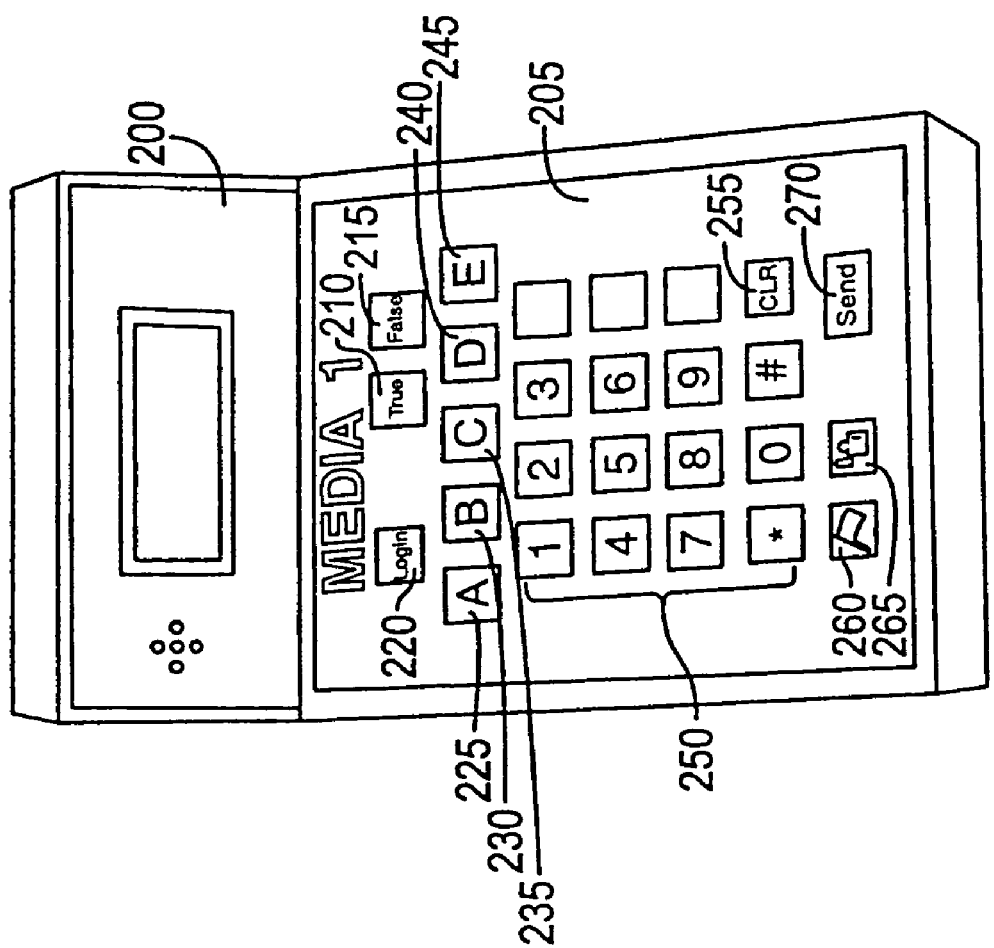
FIG. 2 depicts a response device according to an embodiment of the present invention having a limited keypad.
Figure 3:
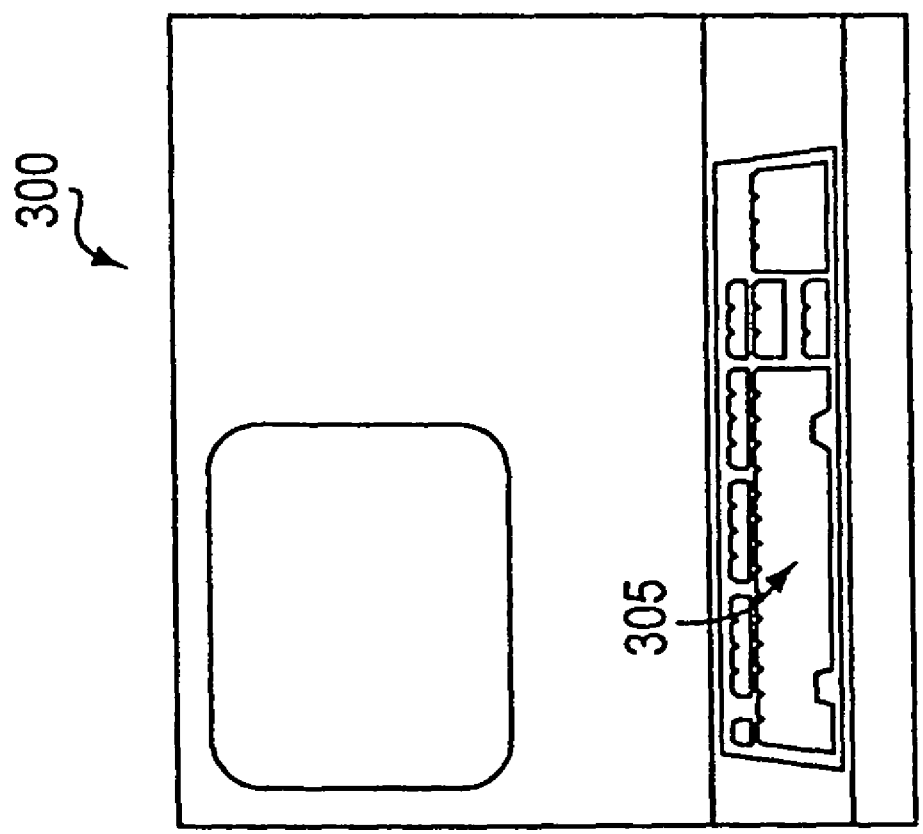
FIG. 3 depicts a response device according to an embodiment of the present invention having a full keypad.

Depending upon the input capabilities available for a particular response device, other data such as a user's name and address can be included with the response data. The functionality of the input capability of a particular response device governs how much response data may be transmitted from a particular response device. Referring to FIG. 2 for example, embodiments of the present invention have a limited key pad 205 on the response device 200. A limited key pad 205, for example, may contain only a few keys such as a true key 210, a false key 215, a login key 220, several keys 225, 230, 235, 240, 245, that are either marked alphabetically or numerically for responding to multiple choice questions, number keys 250, a clear key 255, a flag key 260 (for indicating a user is confused or needs more explanation without posing a question to the broadcaster), a question key 265, and a send key 270. On certain embodiments blank keys 275 are provided to allow additional functionality for the response device 200. Response data from such a response device 200 containing a limited key pad 205 is therefore limited to the choices available to the user presented by the key pad 205. Key pads on a response device range from a limited key pad 205 to a full alpha numeric key pad 305 (FIG. 3) that allows a user of the response device 300 unlimited entry possibilities. Other input capabilities, for example, voice recognition, are within the scope of the present invention as it is well understood by one of ordinary skill in the art.

Certain embodiments of the response device 200 have various features such as a flexible design that is easily assembled by incorporating different types of key pads or other input devices. A "send" key 270 causes the response device to transmit a user's response over the communication system that the response device is configured for. A "clear" key 225 clears prior entries from the response device. A power on/off switch activates and turns off a response device and is configured to interact with both battery power and AC power from an outlet. A log-in key 220 sends a program code (entered by the user) and an identifier to the central location in order to log the user into the computer system at the central location; after the log-in key 220 has been pressed the user is ready to respond to interactive programming.

An optional display (functioning like a calculator's display) can be included, with back lighting to allow a user to better see the display in low light conditions. Such a display would give the user an opportunity to review his inputs prior to submitting his responses. The present invention can operate without requiring a display because the display does not need to receive information, such as choices to which a user responds. However, if the response device is part of a communication module with other standard functions, such functions can still operate for other purposes, such as paging for a device the operates on the two-way pager network, or calling for devices that operate on the cellular or telephone network.

Function keys are provided that perform specialized tasks such as entering a program code, setting the language the response device may display, changing the power level setting to boost transmitting power, changing the back light brightness, performing a test (such as determining whether the response device is communicating with the appropriate communication system), and other special functions.

Other features include an indicator, such as a light emitting diode array, that indicates whether the response device is within range of the communication system. This feature is especially useful for response devices that send and receive information over wireless communication systems. Another indicator lets a user know when the response device has received information that the user may wish to view.

Other embodiments of the response device include an indicator that alerts the user regarding appropriate connection to a telephone line, i.e., whether 48 volts is present or not. A busy indicator informs the user when the telephone line is busy, and prevents the response device from dialing. Software on the response device is configured to receive downloads when the log-in key 220 is pressed and the user is logged in to the central location.

Operation of the response device could be combined with another component, for example, a PDA or a cell phone to create a "hybrid" response device. The device could be used to provide responses to programs broadcast by television, radio, Internet, or another media, as described above. The key or keys on the cell phone or PDA would replace the function of the log-in and other keys. For example, a customer could press *44 and the screen would display "enter program code" or a similar message. The customer could then enter the program code to identify the program. The user could then enter responses to the program, for example, T/F for true/false, A to E for multiple choice answers, or numeric entries, then press "send" to send the responses to a central location for processing. When the program requiring responses ends, the user would press "end" to leave the response mode of the device. The data would be sent either over the device's cell phone network or over a hybrid network such as 3G, which is now common in most of those devices. The type of network is a standard communication network, causing only minor differences in how the response data is handled. A central location would forward all data sent to the location indicated by the *44, which would be assembled and processed to then provide summaries and data to the program producer at the point of origin of the program, if that program were live.

Input capabilities on response devices are varied according to the needs/desires of the presenter and the audience. For a very large audience, or a young audience, a more limited response capability makes the incoming data more uniform and manageable for the presenter. For a small audience, or for complex presentations, a fuller response capability gives flexibility to the audience and to the presenter regarding the types of audience responses that the presenter can address.

Although the present invention has been described with several embodiments, various changes and modifications may be suggested to one skilled in the art. For example, a user response device 100 may communicate over an Internet protocol network utilizing emerging wireless technologies, such broadband communication via satellite. A growing number of choices of wireless technologies, known by various names, could be used to connect the response device to a central network for collection of responses. The device can be made to configure the Internet protocol address automatically, or a user can input the correct address for the central location into the response device 100 to enable the Internet protocol network to interface with and double as a communication network for sending responses to a central location. Utilization of Internet protocol networks enables the present invention to be employed in a more diverse area, i.e., where two-way paging systems and other telecommunication networks do not reach.

It is intended that the present invention encompass such changes and modifications that fall within the scope of the appended claims.

I claim:

1. A method for receiving and processing responses to a program comprising:
    providing a program identifier code for the program;
    providing means for identifying an audience member,
    providing a user input device not requiring a personal computer, the device configured to allow the audience member to send response data directly from the user input device over a standard communication system in response to the program received apart from the device, the device operating without receiving program data;
    having the audience member input the program identifier code into the user input device;
    having the audience member input responses to the program received apart from the device into the user input device;
    transmitting response data comprising the program identifier code, the means for identifying an audience member, and the responses over the standard communication system;
    collecting the response data at a central location;
    correlating the program identifier code to the responses;
    processing the response data.

2. The method of claim 1 which further includes:
    sending the processed data to a presenter of the program for viewing.

3. The method of claim 2 which further includes:
    having the presenter of the program respond to the audience member.

4. The method of claim 1 wherein the program is selected from the group consisting of a radio broadcast, a television broadcast, an Internet broadcast, a satellite communication, an audio tape, a video tape, a printed medium and a live performance.

5. The method of claim 1 wherein the standard communication system is selected from the group consisting of a two-way paging network, a one-way paging network, an internet protocol network, wi-fi, cellular, 802.11g, telenet, a business data network, a 3G system, SMS, web, and an e-mail network.

6. The method of claim 1 which further includes having the audience member log in to a remote computer system before inputting response data into the user input device.

7. A system for receiving and processing responses to a program comprising:
    providing a program identifier code for the program being presented;
    providing a user input device not requiring a personal computer, the device configured to allow an audience member to send response data directly from the user input device over a standard communication system in response to the program received apart from the device, the device operating without receiving program data;
    having the audience member input the program identifier code into the user input device;
    having the audience member input responses to the program received apart from the device into the user input device;
    transmitting the program identifier code and the responses associated with a user identifier over the standard communication system;
    collecting, correlating, and processing the program identifier and the responses;
    routing the responses to a program presenter.

8. The system of claim 7 which further includes:
    having the presenter respond to the audience member.

9. The system of claim 7 wherein the program is selected from the group consisting of a radio broadcast, a television broadcast, an internet broadcast, a satellite communication, an audio tape, a video tape, a printed medium and a live performance.

10. The system of claim 7 wherein the standard communication system is selected from the group consisting of a two-way paging network, a one-way paging network, an Internet protocol network, wi-fi, cellular, 802.11g, telenet, a business data network, a 3G system, SMS, web, and an e-mail network.

11. The system of claim 7 which further includes having the audience member log in to a remote computer system before inputting the program identifier code and the responses into the user input device.

* * * * *